US012777553B2

(12) United States Patent
Guo et al.

(10) Patent No.: US 12,777,553 B2
(45) Date of Patent: Oct. 27, 2026

(54) METHOD AND APPARATUS FOR POWER SAVING ON SIDELINK

(71) Applicant: Lenovo (Beijing) Ltd., Beijing (CN)

(72) Inventors: Xin Guo, Haidian District (CN); Xiaodong Yu, Haidian District (CN); Haiming Wang, Xicheng District (CN); Zhennian Sun, Chaoyang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 694 days.

(21) Appl. No.: 17/794,184

(22) PCT Filed: Jan. 21, 2020

(86) PCT No.: PCT/CN2020/073579
§ 371 (c)(1),
(2) Date: Jul. 20, 2022

(87) PCT Pub. No.: WO2021/146940
PCT Pub. Date: Jul. 29, 2021

(65) Prior Publication Data
US 2023/0066041 A1 Mar. 2, 2023

(51) Int. Cl.
*H04W 76/28* (2018.01)
*H04W 52/02* (2009.01)
*H04W 92/18* (2009.01)

(52) U.S. Cl.
CPC ....... *H04W 76/28* (2018.02); *H04W 52/0216* (2013.01); *H04W 92/18* (2013.01)

(58) Field of Classification Search
CPC . H04W 76/28; H04W 52/0216; H04W 92/18; H04W 24/02; H04W 76/14; Y02D 30/70
See application file for complete search history.

(56) References Cited

U.S. PATENT DOCUMENTS

2019/0174411 A1 6/2019 Xu et al.
2022/0353815 A1* 11/2022 Lin .................. H04W 52/0232
2023/0014303 A1* 1/2023 Di Girolamo ........ H04W 76/28

FOREIGN PATENT DOCUMENTS

CN 109792364 A 5/2015
CN 110679190 A 1/2020
WO WO_2020032698 A1 * 8/2019

OTHER PUBLICATIONS

Intelligent Partial-Sensing-Based Autonomous Resource Allocation for NR V2X, IEEE Internet of Things Journal, vol. 11, No. 2, Jan. 15, 2024, Author: Taehyoung Kim et al. (Year: 2024).*

(Continued)

*Primary Examiner* — Matthew D. Anderson
(74) *Attorney, Agent, or Firm* — FIG. 1 Patents

(57) ABSTRACT

The present application is related to a method and apparatus for power saving for 3 GPP (3rd Generation Partnership Project) 5G new radio (NR) sidelink (SL). A method for wireless communications performed by user equipment (UE) includes: determining whether a sidelink (SL) discontinuous reception (DRX) procedure is enabled; and in response to the SL DRX procedure being enabled, receiving SL DRX configuration information, wherein the SL DRX configuration information contains a priority of the SL DRX procedure.

20 Claims, 11 Drawing Sheets

(56) References Cited

OTHER PUBLICATIONS

LG Electronics , "Summary of email discussion on Rel-17 sidelink enhancement", 3GPP TSG RAN #86, RP-192745, Sitges, ES [retrieved Aug. 4, 2022] Retrieved from the Internet <https://www.3gpp.org/ftp/tsg_ran/TSG_RAN/TSGR_86/Docs>., Dec. 2019, 27 Pages.
LG Electronics Oppo , "Summary of email discussion on sidelink enhancements in Rel-17", 3GPP TSG RAN Meeting #85, RP-191725, Newport Beach, USA [retrieved Aug. 4, 2022]. Retrieved from the Internet <https://www.3gpp.org/ftp/TSG_RAN/TSG_RAN/TSGR_85/joint_RAN_SA/RAN_inputs>., Sep. 2019, 82 Pages.
PCT/CN2020/073579 , "International Preliminary Report on Patentability", PCT Application No. PCT/CN2020/073579, Aug. 4, 2022, 5 pages.
PCT/CN2020/073579 , "International Search Report and Written Opinion", PCT Application No. PCT/CN2020/073579, Oct. 23, 2020, 6 pages.

* cited by examiner

METHOD AND APPARATUS FOR POWER SAVING ON SIDELINK

TECHNICAL FIELD

Embodiments of the present application generally relate to wireless communication technology, especially to a method and an apparatus for power saving for 3GPP (3rd Generation Partnership Project) 5G new radio (NR) sidelink (SL).

BACKGROUND

Vehicle to everything (V2X) has been introduced into 5G wireless communication technology. In terms of a channel structure of V2X communication, a direct link between two user equipments (UEs) is called a sidelink (SL). Sidelink is a long-term evolution (LTE) feature introduced in 3GPP Release 12, and enables a direct communication between UEs in proximity, and data does not need to go through a base station (BS) or a core network.

In 3GPP Release 16, NR sidelink is designed based on an assumption of "always-on" when UE operates on a sidelink, for example, only focusing on UEs installed in vehicles with sufficient battery capacity. Solutions for power saving in 3GPP Release 17 are required for vulnerable road users (VRUs) in V2X use cases and for UEs in public safety and commercial use cases where power consumption in the UEs needs to be minimized. However, details regarding such solutions have not been discussed in 3GPP 5G NR technology yet.

SUMMARY

Some embodiments of the present application provide a method for wireless communications performed by user equipment (UE). The method includes: determining whether a sidelink (SL) discontinuous reception (DRX) procedure is enabled; and in response to the SL DRX procedure being enabled, receiving SL DRX configuration information, wherein the SL DRX configuration information contains a priority of the SL DRX procedure.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by UE.

Some embodiments of the present application provide a method for wireless communications performed by UE. The method includes: receiving, from another UE, partial sensing configuration information; and determining SL DRX configuration information for the foregoing another UE.

Some embodiments of the present application provide an apparatus for wireless communications. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by UE.

Some embodiments of the present application provide a method for wireless communications performed by a base station (BS). The method includes: receiving partial sensing configuration information; and determining SL DRX configuration information for UE.

Some embodiments of the present application provide an apparatus for wireless communications. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a BS.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
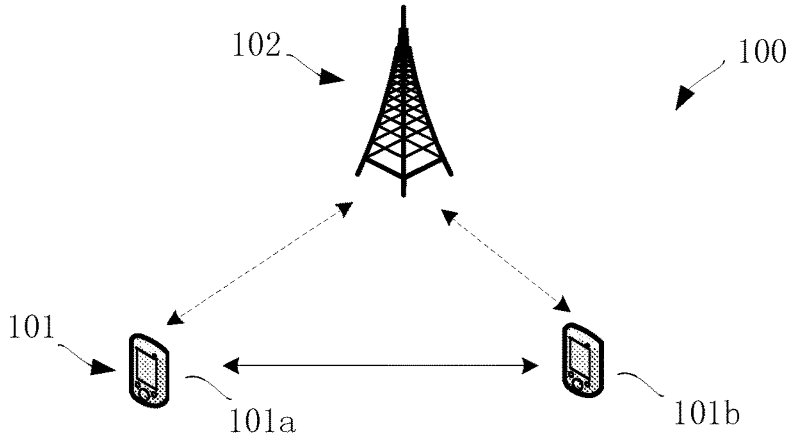
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, a wireless communication system 100 includes at least one user equipment (UE) 101 and at least one base station (BS) 102. In particular, the wireless communication system 100 includes two UEs 101 (e.g., UE 101*a* and UE 101*b*) and one BS 102 for illustrative purpose. Although a specific number of UEs 101 and BS 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, UE is pedestrian UE (P-UE or PUE) or cyclist UE. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via LTE or NR Uu interface.

In some embodiments of the present application, each of the UE(s) 101 may be deployed an IoT application, an eMBB application and/or a URLLC application. For instance, UE 101*a* may implement an IoT application and may be named as an IoT UE, while UE 101*b* may implement an eMBB application and/or a URLLC application and may be named as an eMBB UE, an URLLC UE, or an eMBB/URLLC UE. It is contemplated that the specific type of application(s) deployed in the UE(s) 101 may be varied and not limited.

According to some embodiments of FIG. 1, UE 101*a* functions as Tx UE, and UE 101*b* functions as Rx UE. UE 101*a* may exchange V2X messages with UE 101*b* through a sidelink, for example, PC5 interface as defined in 3GPP TS 23.303. UE 101*a* may transmit information or data to other UE(s) within the V2X communication system, through sidelink unicast, sidelink groupcast, or sidelink broadcast. For instance, UE 101*a* transmits data to UE 101*b* in a sidelink unicast session. UE 101*a* may transmit data to UE 101*b* and other UEs in a groupcast group (not shown in FIG. 1) by a sidelink groupcast transmission session. Also, UE 101*a* may transmit data to UE 101*b* and other UEs (not shown in FIG. 1) by a sidelink broadcast transmission session.

Alternatively, according to some other embodiments of FIG. 1, UE 101*b* functions as Tx UE and transmits V2X messages, UE 101*a* functions as Rx UE and receives the V2X messages from UE 101*b*.

Both UE 101*a* and UE 101*b* in the embodiments of FIG. 1 may transmit information to BS 102 and receive control information from BS 102, for example, via LTE or NR Uu interface. The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the downlink (DL) and the UE(s) 101 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS(s) 102 may communicate with the UE(s) 101 using the 3GPP 5G protocols.

In 3GPP standard document TS36.300 [2], the design related to partial sensing for UE (e.g., PUE) is as follows. Resource pool for transmission of UE may be overlapped with resources for V2X sidelink communication. For each transmission pool, a resource selection mechanism (i.e., a random selection procedure, or a partial sensing based selection mechanism), which is allowed to be used in this transmission pool, is also configured.

A partial sensing based selection mechanism may also be named as a partial sensing based resource selection mechanism, a partial sensing mechanism, a partial sensing procedure, or the like. If UE (e.g., PUE) is configured to use either a random selection mechanism or a partial sensing based selection mechanism for one transmission pool, it is up to implementations of the UE to select a specific resource selection mechanism.

If UE (e.g., a PUE) is configured to use a partial sensing based selection mechanism only, the UE shall use the partial sensing based selection mechanism in the pool. The UE shall not do a random selection mechanism in the pool, since only a partial sensing operation is allowed. If a BS does not provide a random selection pool, the UE that supports only a random selection mechanism cannot perform sidelink transmission. In exceptional pool, the UE uses a random selection mechanism. The UE can send sidelink UE information message to indicate that it requests resource pools for a pedestrian to everything (P2X) related V2X sidelink communication transmission, as specified in 3GPP standard document TS36.331 [3].

According to 3GPP standard document TS36.213 [4], if UE (e.g., PUE) is configured to use a partial sensing based selection mechanism, the UE will monitor the resource only in a subset of subframes. Compared with a random selection mechanism, a partial sensing based selection mechanism can reduce resource collision probability. Compared with a full sensing based selection mechanism, a partial sensing based selection mechanism can achieve power saving to a certain extent.

When UE (e.g., UE 101*a* or UE 101*b* illustrated and shown in FIG. 1) performs a partial sensing based selection mechanism or a partial sensing based reselection mechanism, the UE should have sensed on a sensing window with all allowed resource reservation periodicities configured by a higher layer before using sensing result(s) for resource reselection mechanism. The UE may not know when the resource selection or reselection procedure will be performed, and thus, a sensing window for the UE should be periodical. Without loss of generality, if the first time unit (such as, a subframe in time and frequency domains) of a partial sensing window is as a start point of a partial sensing cycle, distributions of the partial sensing window in time domain can be shown in FIG. 2.

Figure 2:
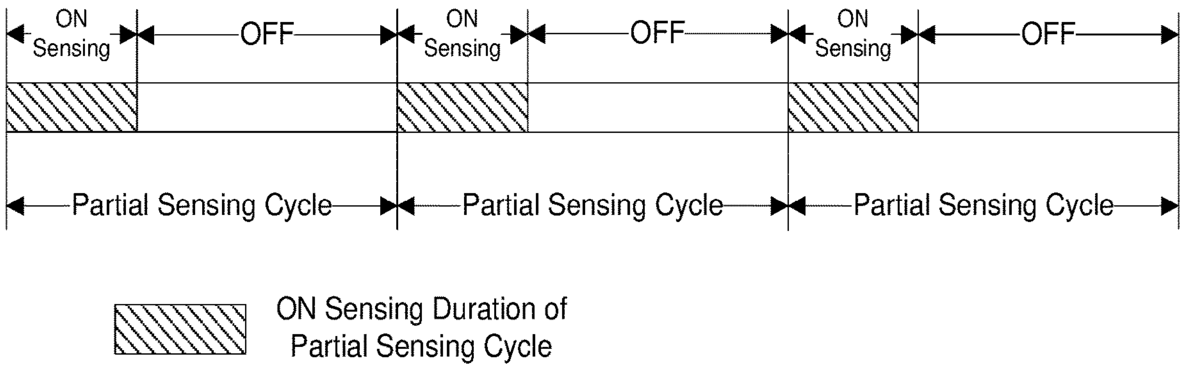
FIG. 2 illustrates an exemplary distribution of a partial sensing window in the time domain in accordance with some embodiments of the present application.

FIG. 2 illustrates an exemplary distribution of a partial sensing window in the time domain in accordance with some embodiments of the present application.

As can be seen, in the embodiments of FIG. 2, there are three partial sensing cycles in a partial sensing window, and each partial sensing cycle (e.g., Partial Sensing Cycle as shown in FIG. 2) includes ON Sensing duration (e.g., ON Sensing as shown in FIG. 2) and OFF duration (e.g., OFF as shown in FIG. 2).

It can be contemplated that in some other embodiments of the present application, there may be more or less multiple partial sensing cycles in a partial sensing window.

ON Sensing duration of a partial sensing cycle may also be named as On Sensing Duration for Partial Sensing, Sensing Active Time of a partial sensing cycle, Sensing Active Time for Partial Sensing, or the like. OFF duration of a partial sensing cycle may also be named as Off Sensing Duration for Partial Sensing, Sensing Inactive Time of a partial sensing cycle, Sensing Inactive Time for Partial Sensing, or the like.

Generally, UE (e.g., UE 101*a* or UE 101*b* illustrated and shown in FIG. 1) in discontinuous reception (DRX) mechanism gets into a sleep mode for a certain period of time and wakes up for another period of time. In the case of NR Uu link, a BS or a network decides when to let UE sleep and when to wake it up and informs the timing to the UE using a RRC message.

Both a partial sensing mechanism and a SL DRX mechanism may help UE (e.g., UE 101*a* or UE 101*b* illustrated and shown in FIG. 1) to save power, because both mechanisms may enable the UE working only in a partial period of the time domain, and configurations for both mechanisms are defined in a periodic manner. However, these two mechanisms differ from each other at that the partial sensing mechanism is designed for transmission resource selection, and the SL DRX mechanism is designed for reception.

Currently, DRX has not been designed for V2X SL communication, e.g., in 3GPP Release 16. That is to say, a SL DRX mechanism has not been supported by a P2X-related V2X communication system. For 3GPP 5G NR V2X technology, configurations of a partial sensing mechanism are independent from configurations of a SL DRX mechanism, and no coordination between these two mechanisms is supported. If both a partial sensing mechanism and a SL DRX mechanism are supported, the issue of how to coordinate configurations for these two mechanisms needs to be addressed for Mode 1 or Mode 2 in 3GPP Release 17 and/or beyond. Wherein, in Mode 1, network schedules resource(s) for a sidelink communication, while in Mode 2, UE autonomously selects resource(s) for a sidelink communication. For a V2X communication system, details of coordinating a partial sensing mechanism and a SL DRX mechanism have not been defined.

Figure 3:
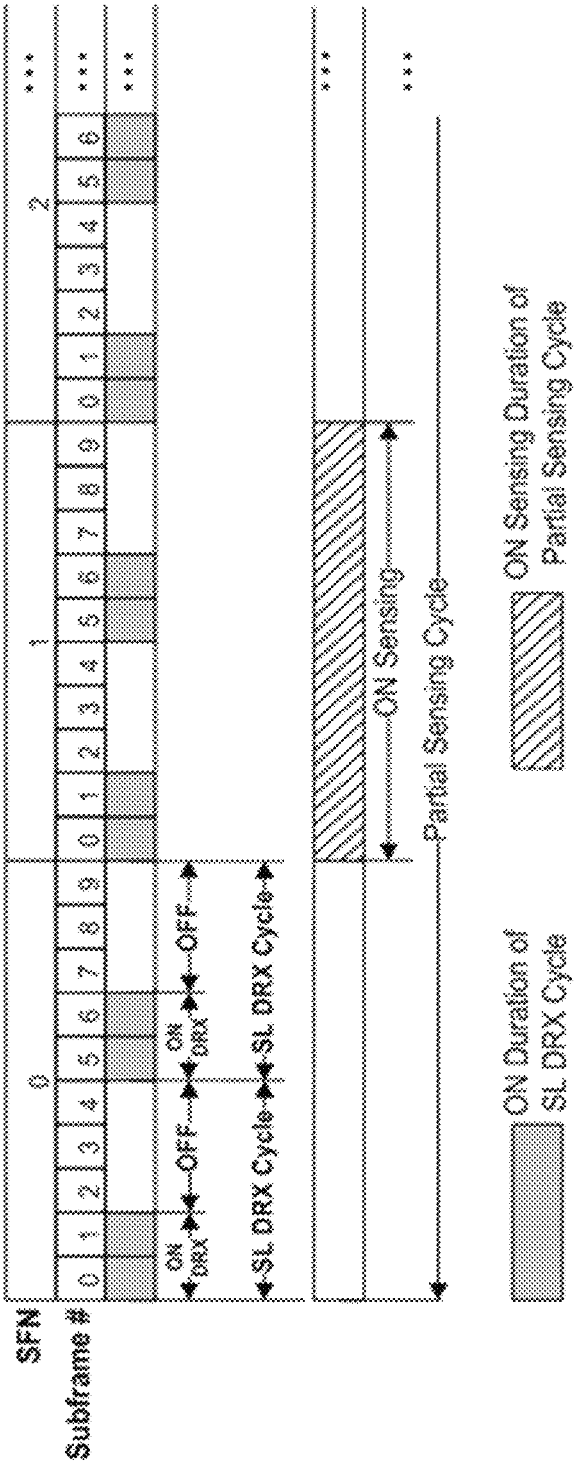
FIG. 3 illustrates exemplary configurations of a partial sensing procedure and a SL DRX procedure in accordance with some embodiments of the present application.

FIG. 3 illustrates exemplary configurations of a partial sensing procedure and a SL DRX procedure in accordance with some embodiments of the present application.

The embodiments of FIG. 3 show three system frames, which are numbered as SFN (System Frame Number) 0, SFN 1, and SFN 2, respectively. Each system frame includes ten subframes. Each system frame includes two SL DRX cycles. Each SL DRX cycle includes five subframes within one system frame. ON Duration of a SL DRX cycle includes two subframes, while OFF Duration of a SL DRX cycle includes the other three subframes.

ON Duration of a SL DRX cycle may also be named as On Duration for SL DRX, Active Time of a SL DRX cycle, Active Time for SL DRX, or the like. OFF Duration of a SL DRX cycle may also be named as Off Duration for SL DRX, Inactive Time of a SL DRX cycle, Inactive Time for SL DRX, or the like.

In particular, as shown in FIG. 3, each of SFN 0, SFN 1, and SFN 2 includes subframe #0 to subframe #9. Each of SFN 0, SFN 1, and SFN 2 includes two SL DRX cycles. One SL DRX cycle includes subframe #0 to subframe #4, ON Duration of the SL DRX cycle (i.e., ON DRX as shown in FIG. 3) includes subframe #0 and subframe #1, while OFF Duration of the SL DRX cycle (i.e., OFF as shown in FIG. 3) includes subframe #2 to subframe #4. The other SL DRX cycle includes subframe #5 to subframe #9, ON Duration of the SL DRX cycle (i.e., ON DRX as shown in FIG. 3) includes subframe #5 and subframe #6, while OFF Duration of the SL DRX cycle (i.e., OFF as shown in FIG. 3) includes subframe #7 to subframe #9.

In certain scenarios, not all system frames are located within ON Sensing Duration of a Partial Sensing Cycle. As shown in FIG. 3, ON Sensing Duration of a Partial Sensing Cycle overlaps with SFN 1 in time domain, while SFN 0 and SFN 2 are located within OFF Duration of the Partial Sensing Cycle.

In these scenarios, if behaviors of UE (e.g., UE 101*a* or UE 101*b* illustrated and shown in FIG. 1) in Off duration for SL DRX are configured as not performing a sensing operation during the Off duration for SL DRX even if a partial sensing window has been configured, the UE cannot perform a sensing operation in subframe #2 to subframe #4 and subframe #7 to subframe #9 of SFN 1. As a result, transmission(s) in succeeding SFNs for the UE, if any, will probably be influenced.

However, if the behaviors of the UE in Off duration for SL DRX are configured as performing a sensing operation during the Off duration for SL DRX when a partial sensing window has been configured, monitoring results in SFN 0 and SFN 2 cannot be used for resource selection. Thus, power saving cannot be efficiently achieved in these scenarios.

Given the above, when both a partial sensing mechanism and a SL DRX mechanism are enabled for UE (e.g., PUE), coordination between configurations of these two mechanisms is needed. Embodiments of the present application aim to provide solutions for coordinating configurations of a partial sensing mechanism and a SL DRX mechanism in a V2X communication system. More details on embodiments of the present application will be illustrated in the following text in combination with the appended drawings.

Figure 4:
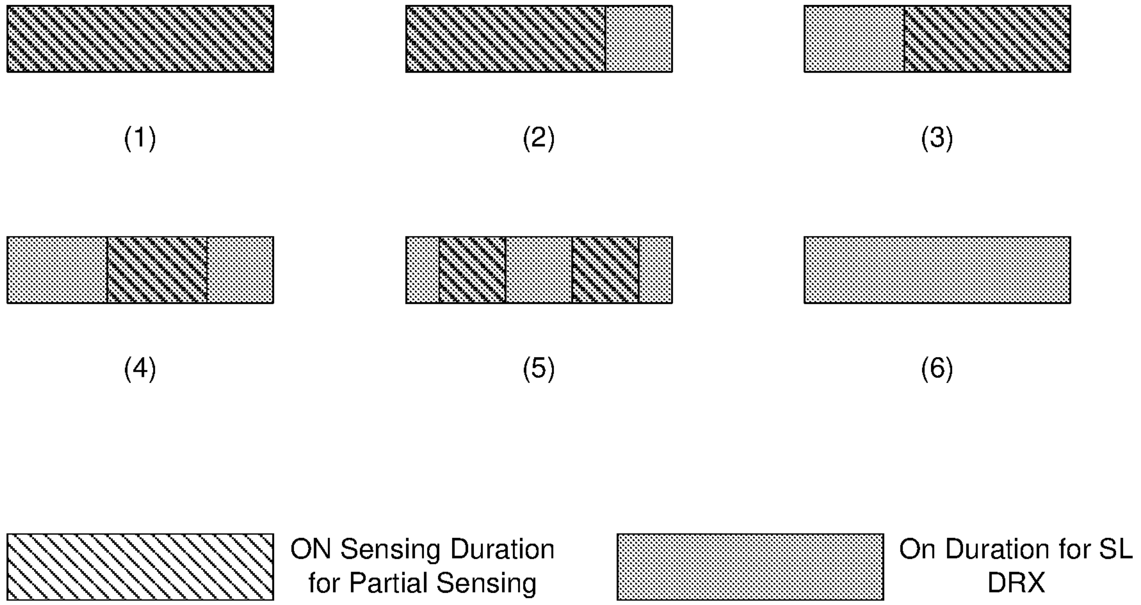
FIG. 4 illustrates six exemplary patterns of on sensing duration for partial sensing contained within on duration for SL DRX in accordance with some embodiments of the present application.

FIG. 4 illustrates six exemplary patterns of on sensing duration for partial sensing contained within on duration for SL DRX in accordance with some embodiments of the present application.

As illustrated in the embodiments of FIG. 4, in pattern (1), On Sensing Duration for Partial Sensing and On Duration for SL DRX overlap with each other in time domain. In pattern (2), On Sensing Duration for Partial Sensing and On Duration for SL DRX partly overlap and have the same start point in time domain. In pattern (3), On Sensing Duration for Partial Sensing and On Duration for SL DRX partly overlap and have the same end point duration.

In pattern (4), On Sensing Duration for Partial Sensing and On Duration for SL DRX partly overlap, but have neither the same start point nor the same end point. In pattern (5), On Sensing Duration for Partial Sensing and On Duration for SL DRX partly overlap, and more than one On Sensing Duration for Partial Sensing are distributed within one On Duration for SL DRX. In pattern (6), one On Duration for SL DRX does not contain On Sensing Duration for Partial Sensing.

In some embodiments of the present application, candidate SL DRX configurations can be pre-configured in a resource pool. UE may determine configurations for both partial sensing and SL DRX mechanisms according to their priorities.

Figure 5:
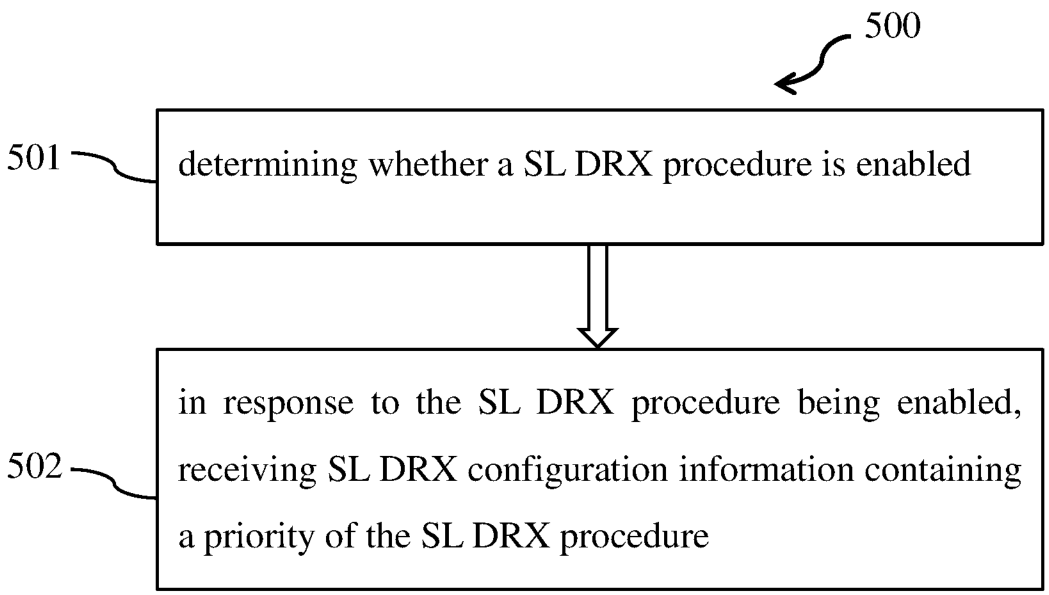
FIG. 5 illustrates a flow chart of a method for wireless communications in accordance with some embodiments of the present application.

FIG. 5 illustrates a flow chart of a method for wireless communications in accordance with some embodiments of the present application. In some embodiments of the present application, the method of FIG. 5 is performed by UE (e.g., PUE), which may function as Rx UE.

In the exemplary method 500 as shown in FIG. 5, in operation 501, UE (e.g., UE 101*a* or UE 101*b* illustrated and shown in FIG. 1) determines whether a SL DRX procedure is enabled. In operation 502, in response to the SL DRX procedure being enabled, the UE receives SL DRX configuration information containing a priority of the SL DRX procedure.

In some embodiments of the present application, the SL DRX configuration information includes a parameter indicating a priority of the SL DRX procedure. The parameter may be selected from one or more priority values. The priority of the SL DRX procedure may be named as 'SL DRX Priority' or the like.

For instance, SL DRX configuration information may include parameters: 'SL DRX Cycle Gap', 'SL DRX Active Time', 'SL DRX Offset', 'SL DRX Priority', or a combination thereof. Details are shown in Table 1.

TABLE 1

| SL DRX Configuration Parameter | Description |
|---|---|
| SL DRX Cycle Gap | The SL DRX Cycle Gap is a parameter indicating a duration of a SL DRX cycle. A SL DRX cycle length is defined as a duration which equals to one 'ON time' plus one 'OFF time'. The value of SL DRX cycle length may be expressed in one or more time units. The time unit can be a frame, a subframe, a timeslot, or a symbol. As an example, a SL DRX cycle length can be measured by multiplying SL DRX Cycle Gap by a pre-defined time duration. |
| SL DRX Active Time | To indicate the duration of one 'ON time'. |
| SL DRX Offset | To indicate an offset of the first time unit of an On Duration from a certain reference time unit. |
| SL DRX Priority | To indicate a priority associated with the SL DRX procedure. The SL DRX Priority can include one priority value or a sequence of priority values. |

In some embodiments of the present application, a priority of a partial sensing procedure is determined based on a priority of predicted transmission traffic. In some other embodiments of the present application, a default priority is used as a priority of a partial sensing procedure. The priority of a partial sensing procedure may be named as 'Partial Sensing Priority', 'sensingPriority', or the like.

For instance, partial sensing configuration information may include parameters: 'Partial Sensing Cycle Gap', 'Partial Sensing Active Time', 'Partial Sensing Offset', 'Partial Sensing Priority', or a combination thereof. Details are shown in Table 2.

TABLE 2

| Partial Sensing Configuration Parameter | Description |
| --- | --- |
| Partial Sensing Cycle Gap | The Partial Sensing Cycle Gap is a parameter indicating a duration of a partial sensing cycle. A partial sensing cycle length is defined as a duration which equals to one 'ON time' plus one 'OFF time'. The value of a partial sensing cycle length may be expressed in one or more time units. The time unit can be a frame, a subframe, a timeslot, or a symbol. As an example, a partial sensing cycle length can be measured by multiplying the Partial Sensing Cycle Gap by a pre-defined time duration. |
| Partial Sensing Active Time | To indicate the duration of one 'On Sensing' or one sensing window. The value of Partial Sensing Active Time may be expressed in one or more time units. The time unit can be a frame, a subframe, a timeslot, or a symbol. |
| Partial Sensing Offset | To indicate an offset of the first time unit of an On Sensing Duration (or a partial sensing window) from a certain reference time unit. |
| Partial Sensing Priority | To indicate a priority associated with the partial sensing procedure. |

The SL DRX configuration information may be received from at least one of medium access control (MAC) layer and higher layers of UE. For instance, the SL DRX configuration information is configured by radio resource control (RRC) signaling or by a MAC control element (CE).

The SL DRX configuration information may be determined based on a priority of predicted reception traffic. The SL DRX configuration information may be determined based on a default priority of the SL DRX procedure. For example, UE determines SL DRX configuration information in a higher layer, e.g., MAC layer or more higher layer(s). At least one of the MAC layer and more higher layer(s) of the UE may transmit both a priority of a partial sensing procedure (e.g., 'Partial Sensing Priority') and the determined SL DRX configuration information to a physical layer of the UE. For instance, the MAC layer transmits 'Partial Sensing Priority' and the SL DRX configuration information to the physical layer of the UE by RRC signaling.

A physical layer of UE may compare a priority of a partial sensing procedure (e.g., 'Partial Sensing Priority' received from a higher layer) and a priority of a SL DRX procedure (e.g., 'SL DRX Priority' received from a higher layer). The UE may perform different operations according to different comparing results of the physical layer. Details regarding some embodiments of the subject application are as follows.

If a SL DRX procedure has a higher priority than a partial sensing procedure, when determining a candidate subframe of resource for physical sidelink shared channel (PSSCH) transmission, UE should guarantee that the associated subframe to be monitored is contained in a certain on duration of a SL DRX procedure which is configured by a higher layer of the UE.

If monitoring of a set of subframes associated with a set of candidate subframes of resource for PSSCH transmission is excluded due to Off duration of a SL DRX procedure, and a random selection mechanism is also supported for the resource pool, the UE can select a resource from the set of candidate subframes based on a random selection mechanism.

In some embodiments of the present application, if a SL DRX procedure has a higher priority than a partial sensing procedure according to comparing results of the physical layer of UE, the UE may perform any one of the following steps:

(1) performing a sensing operation in on sensing duration of the partial sensing procedure, when the on sensing duration is located within on duration of the SL DRX procedure, to monitor one or more partial sensing subframes for PSSCH transmission.

(2) stopping performing a sensing operation in on sensing duration of the partial sensing procedure, when the on sensing duration is located within off duration of the SL DRX procedure.

(3) in response to supporting a random selection procedure for a resource pool, using the random selection procedure to select a resource from a set of candidate subframes, which correspond to on sensing duration of the partial sensing procedure, when the on sensing duration is located within the off duration of the SL DRX procedure.

If a partial sensing procedure has a higher priority than a SL DRX procedure, when determining a candidate subframe of resource for PSSCH transmission, UE may determine subframe to be monitored, and the UE may adjust SL DRX configuration information to align with the subframes to be monitored for partial sensing. If a subframe to be monitored for partial sensing is located within Off duration of the SL DRX procedure, the UE will still monitor the subframe, so as to guarantee the predicted transmission.

If NR SL latency is set with [10 ms, 30 ms, 50 ms, 100 ms], a SL DRX procedure may have a cycle of [10 ms, 30 ms, 50 ms, 100 ms]. Considering NR SL support transmission in one slot, on duration for SL DRX can be set as 1 subframe or 2 subframes. As defined in 3GPP Release 14, a partial sensing procedure probably has a pattern of one 10 ms on sensing duration every a cycle of 100 ms. Details may refer to FIG. 3. If a partial sensing procedure has a higher priority, the candidate resource for transmission should be guaranteed. Therefore, the subject application proposes "if a subframe to be monitored for partial sensing locates within SL DRX Off, UE will still monitor the subframe to guarantee the supposed transmission."

In some further embodiments of the present application, if a partial sensing procedure has a higher priority than a SL DRX procedure according to comparing results of the physical layer of UE, the UE may perform a sensing operation in on sensing duration of the partial sensing procedure, when the on sensing duration of the partial sensing procedure is located within either off duration of the SL DRX procedure or on duration of the SL DRX procedure. In other words, even if on sensing duration of a partial sensing procedure is located within off duration of a SL DRX procedure, the UE still performs a sensing operation in the on sensing duration of the partial sensing procedure.

Details described in all the foregoing embodiments of the present application (for example, specific operations of a physical layer of UE according to different comparing results of priorities of a partial sensing procedure and a SL DRX procedure) are applicable for all the embodiments as shown in FIGS. 6-15.

When a SL DRX procedure for Rx UE is configured by Tx UE, the Tx UE may determine the configuration for the Rx UE based on partial sensing configuration information reported from the Rx UE.

In some embodiments of the present application, Rx UE reports partial sensing configuration information to Tx UE. The partial sensing configuration information may include an indicator to indicate whether a partial sensing procedure is configured for the Rx UE. The Rx UE may receive, from the Tx UE, an indicator to trigger a SL DRX procedure. For example, the indicator received from the Tx UE is included in sideline control information (SCI) or in a MAC CE.

In some embodiments of the present application, Rx UE receives SL DRX configuration information from Tx UE. The SL DRX configuration information received from the Tx UE may be determined based on traffic, which is to be transmitted to the Rx UE, and partial sensing configuration information received from the Rx UE.

Figure 6:
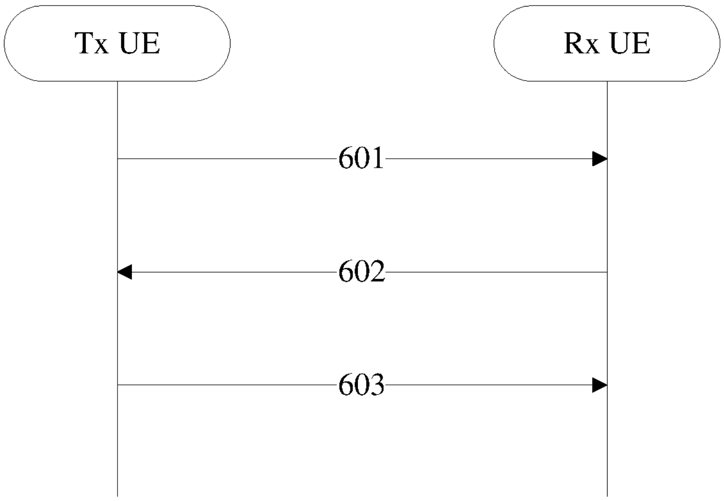
FIG. 6 illustrates an exemplary flow chart illustrating a method for power saving on NR SL in accordance with some embodiments of the present application.

FIG. 6 illustrates an exemplary flow chart illustrating a method for power saving on NR SL in accordance with some embodiments of the present application.

In the embodiments of FIG. 6, in step 601, Tx UE (e.g., UE 101*a* or UE 101*b* illustrated and shown in FIG. 1) sends an indication to Rx UE (e.g., UE 101*b* or UE 101*a* illustrated and shown in FIG. 1) to trigger a SL DRX procedure. Such indication can be transmitted by SCI signaling or by a MAC CE.

In step 602, upon receiving the indication from the Tx UE, the Rx UE reports partial sensing configuration information to the Tx UE. For example, the Rx UE reports partial sensing configuration information by SCI signaling or a MAC CE.

The partial sensing configuration information may comprise the following one or more items:

(1) An indicator, which indicates if a partial sensing procedure is configured for the Rx UE.

(2) Information regarding a priority of a partial sensing procedure (e.g., 'Partial Sensing Priority' as shown in Table 2), if the partial sensing procedure is configured for the Rx UE.

(3) Parameters of 'Partial Sensing Cycle Gap', 'Partial Sensing Active Time', 'Partial Sensing Offset' and 'Partial Sensing Priority', as shown in Table 2, or a combination thereof, if a partial sensing procedure is configured for the Rx UE.

In step 603, the Tx UE determines SL DRX configuration information for the Rx UE, and then transmits the SL DRX configuration information to the Rx UE. The Tx UE may determine the SL DRX configuration information based on traffic, which is to be transmitted to the Rx UE, and the latest received partial sensing configuration information. The SL DRX configuration information may be transmitted by SCI signaling or a MAC CE. The SL DRX configuration information may include at least one of 'SL DRX Active Time', 'SL DRX Offset', 'SL DRX Cycle Gap', and 'SL DRX Priority' as shown in Table 1.

After receiving the SL DRX configuration information from the Tx UE, the Rx UE may perform any of the operations of a physical layer as described above. For instance, a physical layer of the Rx UE may compare a priority of a partial sensing procedure (e.g., 'Partial Sensing Priority' received from the Tx UE) and a priority of a SL DRX procedure (e.g., 'SL DRX Priority' received from the Tx UE). The Rx UE may perform different operations according to different comparing results of the physical layer, as described above.

In some embodiments of the present application, a SL DRX procedure for Rx UE is triggered by a SL DRX configuration within the Rx UE.

Figure 7:
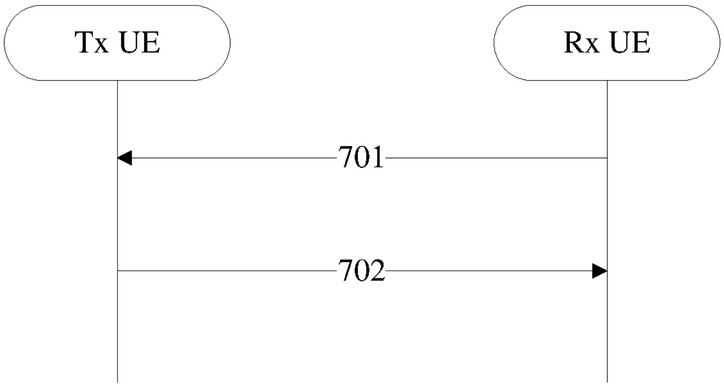
FIG. 7 illustrates a further exemplary flow chart illustrating a method for power saving on NR SL in accordance with some embodiments of the present application.

FIG. 7 illustrates a further exemplary flow chart illustrating a method for power saving on NR SL in accordance with some embodiments of the present application.

In the embodiments of FIG. 7, in step 701, once a SL connection is established, Rx UE (e.g., UE 101*a* or UE 101*b* illustrated and shown in FIG. 1) reports partial sensing configuration information to Tx UE (e.g., UE 101*b* or UE 101*a* illustrated and shown in FIG. 1). Subsequently, the Rx UE will only have to report when information of its partial sensing configuration changes. The Rx UE may report partial sensing configuration information by SCI signaling or a MAC CE. The contents described for step 602 in FIG. 6 may be applicable for step 701, for example, contents of the partial sensing configuration information.

In step 702, when needed, the Tx UE determines SL DRX configuration information for the Rx UE, and then transmits the SL DRX configuration information to the Rx UE. The Tx UE may determine SL DRX configuration information based on traffic to be transmitted to the Rx UE and the latest received partial sensing configuration information. The contents described for step 603 in FIG. 6 may be applicable for step 702.

Figure 8:
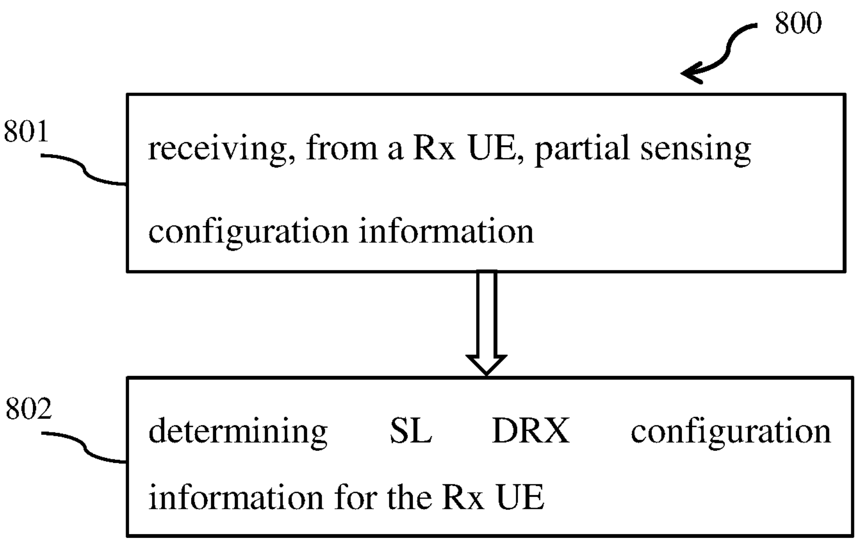
FIG. 8 illustrates a further flow chart of a method for wireless communications in accordance with some embodiments of the present application.

FIG. 8 illustrates a further flow chart of a method for wireless communications in accordance with some embodiments of the present application. The method of FIG. 8 may be performed by Tx UE.

In the exemplary method 800 as shown in FIG. 8, in operation 801, Tx UE (e.g., UE 101*a* or UE 101*b* illustrated and shown in FIG. 1) receives, from Rx UE (e.g., UE 101*b* or UE 101*a* as shown in FIG. 1), partial sensing configuration information. In operation 802, the Tx UE determines SL DRX configuration information for the Rx UE. In one example, the SL DRX configuration information is determined based on the partial sensing configuration information. In another example, the SL DRX configuration information is determined based on traffic to be transmitted over a SL to the Rx UE.

In order to determine SL DRX configuration information for the Rx UE, the Tx UE may compare a priority for traffic to be transmitted and a priority of a partial sensing procedure for the Rx UE.

The embodiments of FIG. 8 may include further operations performed by the Tx UE. For instance, the Tx UE transmits, to the Rx UE, an indicator to trigger a SL DRX procedure. The indicator may be included in SCI or a MAC CE. The Tx UE may transmit the SL DRX configuration information to the Rx UE.

In some embodiments, the Tx UE may transmit a request to a BS to trigger a SL DRX procedure for the Rx UE. The request may include the partial sensing configuration information. Then, the Tx UE may receive, from the BS, SL DRX configuration information for the Rx UE.

In some embodiments, the Tx UE may receive, from a BS, an indication to trigger the SL DRX procedure for the Rx UE. The Tx UE may report, to the BS, the partial sensing configuration information. Then, the Tx UE may receive, from the BS, SL DRX configuration information for the Rx UE.

Details described in all others embodiments of the present application (for example, how to determine SL DRX configuration information) are applicable for the embodiments as shown in FIG. 8.

In some embodiments of the present application, when SL DRX for Rx UE is configured by a BS or a network, the BS or the network will determine the configuration for the Rx UE based on partial sensing configuration information of the Rx UE. For example, the partial sensing configuration information of the Rx UE is reported via Tx UE. For a further example, the partial sensing configuration information of the Rx UE is reported by Rx UE.

Figure 9:
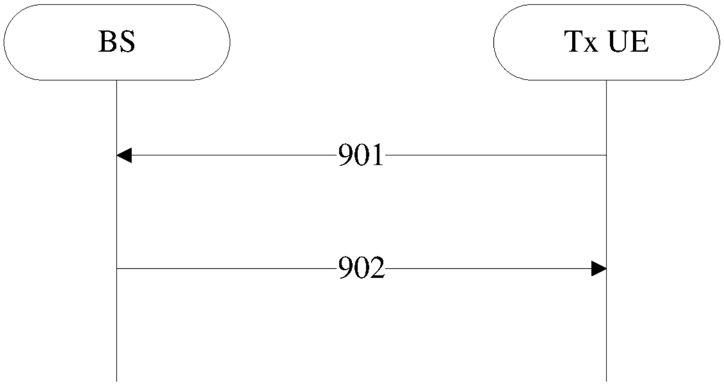
FIG. 9 illustrates another exemplary flow chart illustrating a method for power saving on NR SL in accordance with some embodiments of the present application.

FIG. 9 illustrates another exemplary flow chart illustrating a method for power saving on NR SL in accordance with some embodiments of the present application. In the embodiments of FIG. 9, Tx UE triggers a SL DRX procedure for Rx UE.

In the embodiments of FIG. 9, in step 901, Tx UE (e.g., UE 101*a* or UE 101*b* illustrated and shown in FIG. 1) sends a request to a BS (e.g., BS 102 as shown in FIG. 1), to trigger a SL DRX procedure for Rx UE (e.g., UE 101*b* or UE 101*a* illustrated and shown in FIG. 1).

The request can be sent by a MAC CE in Uplink or by Uplink Control Information (UCI) signaling. The request can include partial sensing configuration information of the Rx UE. Such partial sensing configuration information may comprise one or more items as described above for the embodiments of FIG. 6.

In step 902, the BS determines SL DRX configuration information for the Rx UE, and then sends the SL DRX configuration information to the Tx UE. The SL DRX configuration information may be determined based on SL traffic(s) to be transmitted to the Rx UE and the partial sensing configuration information. Further, the BS may determine resource(s) for Tx UE to transmit the SL DRX configuration information to the Rx UE over SL, and send the information of the resource to the Tx UE.

The SL DRX configuration information may be sent by a MAC CE in Downlink or by Downlink Control Information (DCI) signaling. The SL DRX configuration information may include at least one of 'SL DRX Active Time', 'SL DRX Offset' and 'SL DRX Cycle Gap' and 'SL DRX Priority' as shown in Table 1.

Figure 10:
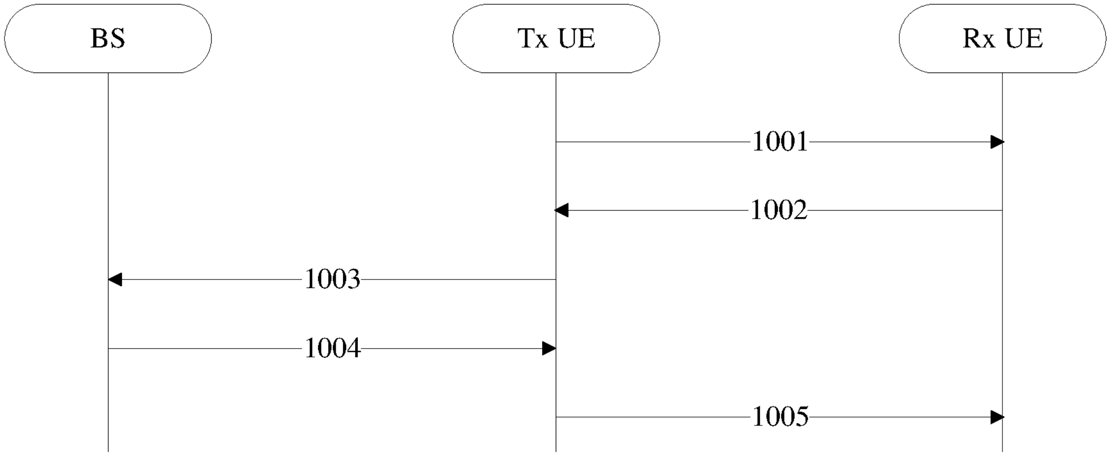
FIG. 10 illustrates an additional exemplary flow chart illustrating a method for power saving on NR SL in accordance with some embodiments of the present application.

FIG. 10 illustrates an additional exemplary flow chart illustrating a method for power saving on NR SL in accordance with some embodiments of the present application. The embodiments of FIG. 10 correspond to a combination of the embodiments of FIG. 6 and FIG. 9.

In particular, in the embodiments of FIG. 10, in step 1001, Tx UE (e.g., UE 101*a* or UE 101*b* illustrated and shown in FIG. 1) sends an indication to Rx UE (e.g., UE 101*b* or UE 101*a* illustrated and shown in FIG. 1) to trigger a SL DRX procedure. The contents described for step 601 in FIG. 6 may be applicable for step 1001.

In step 1002, upon receiving the indication from the Tx UE, the Rx UE reports partial sensing configuration information to the Tx UE. The contents described for step 602 in FIG. 6 may be applicable for step 1002.

In step 1003, the Tx UE sends a request to a BS (e.g., BS 102 as shown in FIG. 1), to trigger a SL DRX procedure for the Rx UE. The contents described for step 901 in FIG. 9 may be applicable for step 1003.

In step 1004, the BS determines SL DRX configuration information for the Rx UE, and then sends the SL DRX configuration information to the Tx UE. The contents described for step 902 in FIG. 9 may be applicable for step 1004.

In step 1005, upon receiving the SL DRX configuration information from the BS in step 1004, the Tx UE further forwards the SL DRX configuration information to the Rx UE. The Tx UE may forward the SL DRX configuration information to the Rx UE by using the resource indicated by the BS.

Details described in all other embodiments of the present application (for example, operations of a physical layer of the Rx UE) are applicable for the embodiments as shown in FIG. 10.

Figure 11:
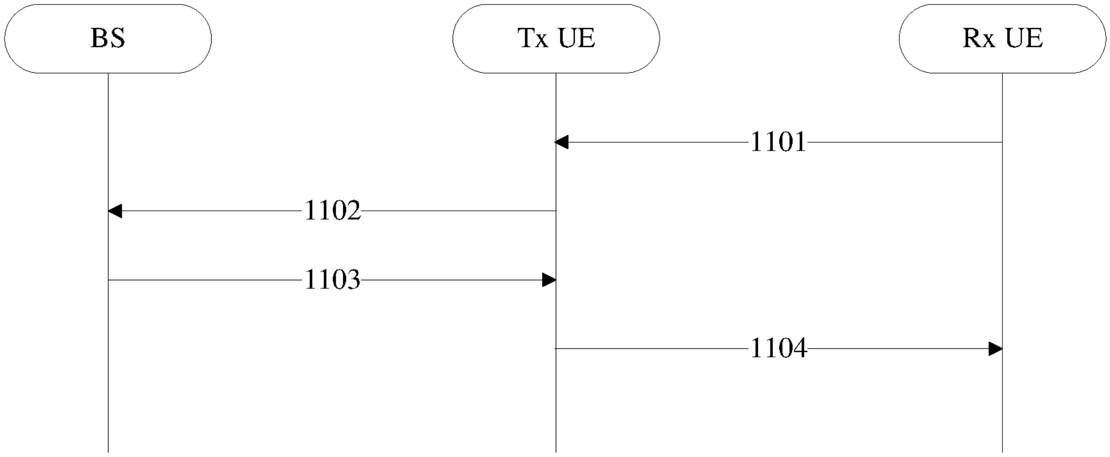
FIG. 11 illustrates an additional exemplary flow chart illustrating a method for power saving on NR SL in accordance with some embodiments of the present application.

FIG. 11 illustrates an additional exemplary flow chart illustrating a method for power saving on NR SL in accordance with some embodiments of the present application. The embodiments of FIG. 11 correspond to a combination of the embodiments of FIG. 7 and FIG. 9.

In particular, in the embodiments of FIG. 11, in step 1101, once a SL connection is established, Rx UE (e.g., UE 101*a* or UE 101*b* illustrated and shown in FIG. 1) reports partial sensing configuration information to Tx UE (e.g., UE 101*b* or UE 101*a* illustrated and shown in FIG. 1). The contents described for step 701 in FIG. 7 may be applicable for step 1101.

In step 1102, the Tx UE sends a request to a BS (e.g., BS 102 as shown in FIG. 1), to trigger a SL DRX procedure for the Rx UE. The contents described for step 901 in FIG. 9 may be applicable for step 1102.

In step 1103, the BS determines SL DRX configuration information for the Rx UE, and then sends the SL DRX configuration information to the Tx UE. The contents described for step 902 in FIG. 9 may be applicable for step 1103.

In step 1104, upon receiving the SL DRX configuration information from the BS in step 1103, the Tx UE further forwards the SL DRX configuration information to the Rx UE. The Tx UE may forward the SL DRX configuration information to the Rx UE by using the resource indicated by the BS.

Details described in all other embodiments of the present application (for example, operations of a physical layer of the Rx UE) are applicable for the embodiments as shown in FIG. 11.

Figure 12:
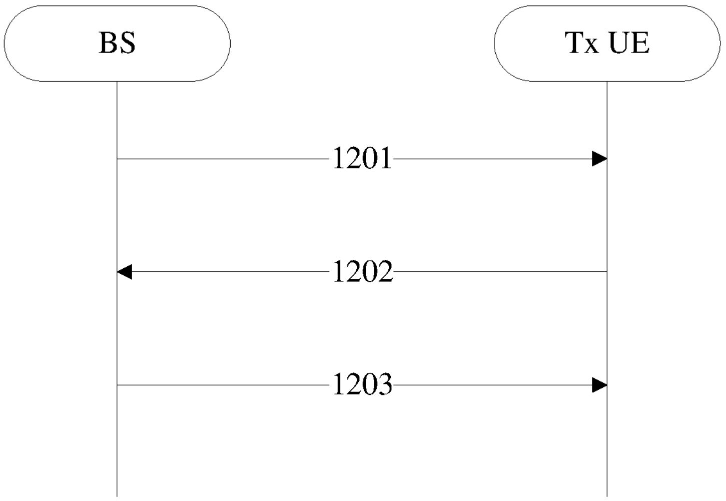
FIG. 12 illustrates an additional exemplary flow chart illustrating a method for power saving on NR SL in accordance with some embodiments of the present application.

FIG. 12 illustrates an additional exemplary flow chart illustrating a method for power saving on NR SL in accordance with some embodiments of the present application. In the embodiments of FIG. 12, a BS triggers a SL DRX procedure for Rx UE, and the Rx UE may work in both Mode 1 and Mode 2.

In the embodiments of FIG. 12, in step 1201, a BS (e.g., BS 102 as shown in FIG. 1) sends an indication to Tx UE (e.g., UE 101*a* or UE 101*b* illustrated and shown in FIG. 1), to trigger a SL DRX procedure for Rx UE (e.g., UE 101*b* or UE 101*a* illustrated and shown in FIG. 1). Such an indication can be sent by DCI signaling or by a MAC CE in Downlink.

In step 1202, upon receiving the indication from the BS, the Tx UE reports partial sensing configuration information of the Rx UE. The partial sensing configuration information can be sent by a MAC CE in Uplink or by UCI signaling. The partial sensing configuration information may comprise one or more items as described above for the embodiments of FIG. 6.

In step 1203, the BS determines SL DRX configuration information for the Rx UE, and then sends the SL DRX configuration information to the Tx UE. The SL DRX configuration information may be determined based on SL traffic(s) to be transmitted to the Rx UE and the partial sensing configuration information. The contents described for step 902 in FIG. 9 may be applicable for step 1203.

Figure 13:
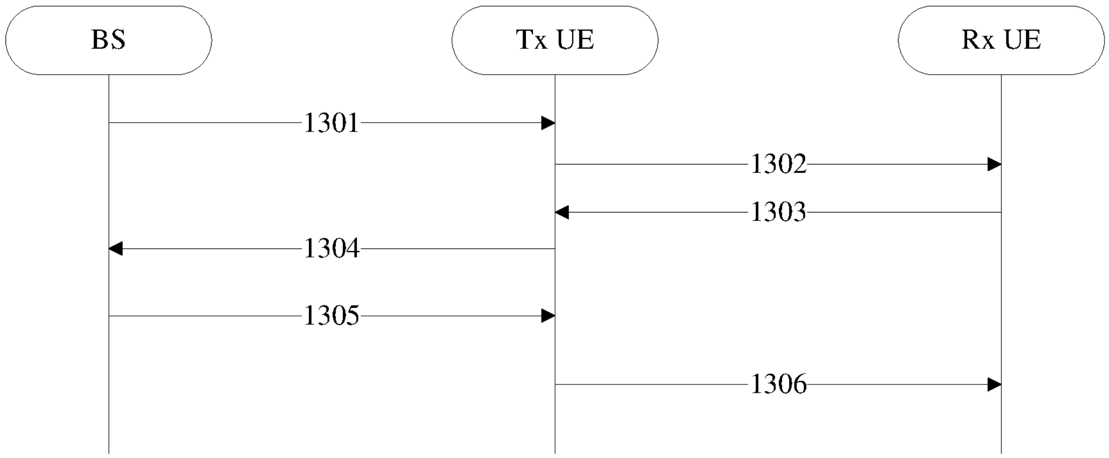
FIG. 13 illustrates an additional exemplary flow chart illustrating a method for power saving on NR SL in accordance with some embodiments of the present application.

FIG. 13 illustrates an additional exemplary flow chart illustrating a method for power saving on NR SL in accordance with some embodiments of the present application. The embodiments of FIG. 13 correspond to a combination of the embodiments of FIG. 6 and FIG. 12.

In particular, in the embodiments of FIG. 13, in step 1301, a BS (e.g., BS 102 as shown in FIG. 1) sends an indication to Tx UE (e.g., UE 101*a* or UE 101*b* illustrated and shown in FIG. 1), to trigger a SL DRX procedure for Rx UE (e.g., UE 101*b* or UE 101*a* illustrated and shown in FIG. 1). The contents described for step 1201 in FIG. 12 may be applicable for step 1301.

In step 1302, the Tx UE sends an indication to the Rx UE, to trigger a SL DRX procedure. The contents described for step 601 in FIG. 6 may be applicable for step 1302.

In step 1303, upon receiving the indication from the Tx UE, the Rx UE reports partial sensing configuration information to the Tx UE. The contents described for step 602 in FIG. 6 may be applicable for step 1303.

In step 1304, the Tx UE reports, to the BS, the partial sensing configuration information of the Rx UE. The contents described for step 1202 in FIG. 12 may be applicable for step 1304.

In step 1305, the BS determines SL DRX configuration information for the Rx UE, and then sends the SL DRX configuration information to the Tx UE. The contents described for step 1203 in FIG. 12 may be applicable for step 1305.

In step 1306, upon receiving the SL DRX configuration information from the BS in step 1305, the Tx UE further forwards the SL DRX configuration information to the Rx UE. The Tx UE may forward the SL DRX configuration information to the Rx UE by using the resource indicated by the BS.

Details described in all other embodiments of the present application (for example, operations of a physical layer of the Rx UE) are applicable for the embodiments as shown in FIG. 13.

Figure 14:
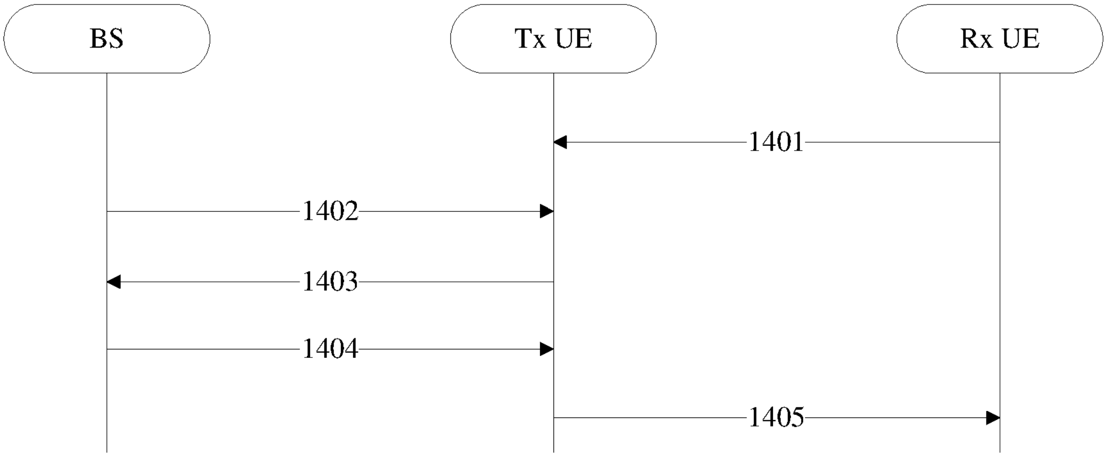
FIG. 14 illustrates an additional exemplary flow chart illustrating a method for power saving on NR SL in accordance with some embodiments of the present application.

FIG. 14 illustrates an additional exemplary flow chart illustrating a method for power saving on NR SL in accordance with some embodiments of the present application. The embodiments of FIG. 14 correspond to a combination of the embodiments of FIG. 7 and FIG. 12.

In particular, in the embodiments of FIG. 14, in step 1401, once a SL connection is established, Rx UE (e.g., UE 101*a* or UE 101*b* illustrated and shown in FIG. 1) reports partial sensing configuration information to Tx UE (e.g., UE 101*b* or UE 101*a* illustrated and shown in FIG. 1). The contents described for step 701 in FIG. 7 may be applicable for step 1401.

In step 1402, a BS (e.g., BS 102 as shown in FIG. 1) sends an indication to the Tx UE, to trigger a SL DRX procedure for the Rx UE. The contents described for step 1201 in FIG. 12 may be applicable for step 1402.

In step 1403, the Tx UE reports partial sensing configuration information of the Rx UE. The contents described for step 1202 in FIG. 12 may be applicable for step 1403.

In step 1404, the BS determines SL DRX configuration information for the Rx UE, and then sends the SL DRX configuration information to the Tx UE. The contents described for step 1203 in FIG. 12 may be applicable for step 1404.

In step 1405, upon receiving the SL DRX configuration information from the BS in step 1404, the Tx UE further forwards the SL DRX configuration information to the Rx UE. The Tx UE may forward the SL DRX configuration information to the Rx UE by using the resource indicated by the BS.

Details described in all other embodiments of the present application (for example, operations of a physical layer of the Rx UE) are applicable for the embodiments as shown in FIG. 14.

Figure 15:
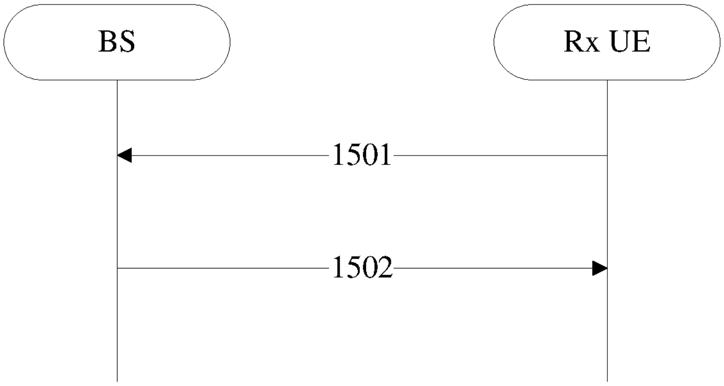
FIG. 15 illustrates an additional exemplary flow chart illustrating a method for power saving on NR SL in accordance with some embodiments of the present application.

FIG. 15 illustrates an additional exemplary flow chart illustrating a method for power saving on NR SL in accordance with some embodiments of the present application. In the embodiments of FIG. 15, Rx UE triggers a SL DRX procedure for the Rx UE, and the Rx UE works in both Mode 1 and Mode 2.

Specifically, in the embodiments of FIG. 15, in step 1501, Rx UE (e.g., UE 101*b* or UE 101*a* illustrated and shown in FIG. 1) directly reports partial sensing configuration information to a BS (e.g., BS 102 as shown in FIG. 1). In step 1502, the BS determines SL DRX configuration information for the Rx UE, and then directly transmits SL DRX configuration information to the Rx UE.

Details described in all other embodiments of the present application (for example, operations of a physical layer of the Rx UE) are applicable for the embodiments as shown in FIG. 15.

Figure 16:
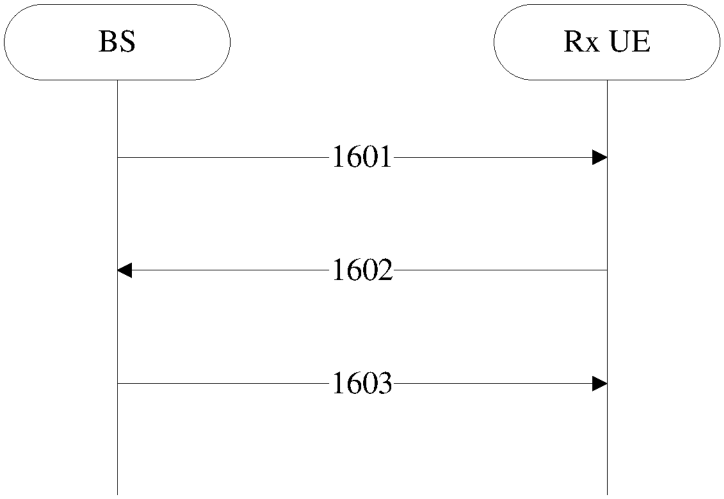
FIG. 16 illustrates an additional exemplary flow chart illustrating a method for power saving on NR SL in accordance with some embodiments of the present application.

FIG. 16 illustrates an additional exemplary flow chart illustrating a method for power saving on NR SL in accordance with some embodiments of the present application. In the embodiments of FIG. 16, a BS triggers a SL DRX procedure for Rx UE, and the Rx UE works in both Mode 1 and Mode 2.

Similar to the embodiments of FIG. 15, the Rx UE reports partial sensing configuration information to a BS and then receives SL DRX configuration information from the BS directly. Details described in all other embodiments of the present application (for example, operations of a physical layer of the Rx UE) are applicable for the embodiments as shown in FIG. 16.

Figure 17:
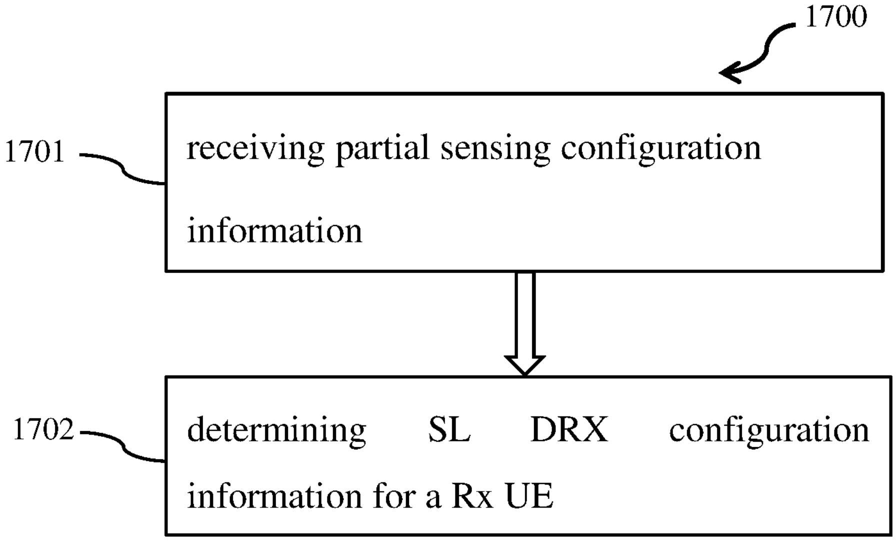
FIG. 17 illustrates another flow chart of a method for wireless communications in accordance with some embodiments of the present application.

FIG. 17 illustrates another flow chart of a method for wireless communications in accordance with some embodiments of the present application. In some embodiments of the present application, the method of FIG. 17 is performed by a BS.

In the exemplary method 1700 as shown in FIG. 17, in operation 1701, a BS (e.g., BS 102 as shown in FIG. 1) receives partial sensing configuration information. In operation 1702, the BS determines SL DRX configuration information for Rx UE.

Details described in all the foregoing embodiments of the present application (for example, how to coordinate configurations for a partial sensing mechanism and a SL DRX mechanism) are applicable for the embodiments as shown in FIG. 17.

Figure 18:
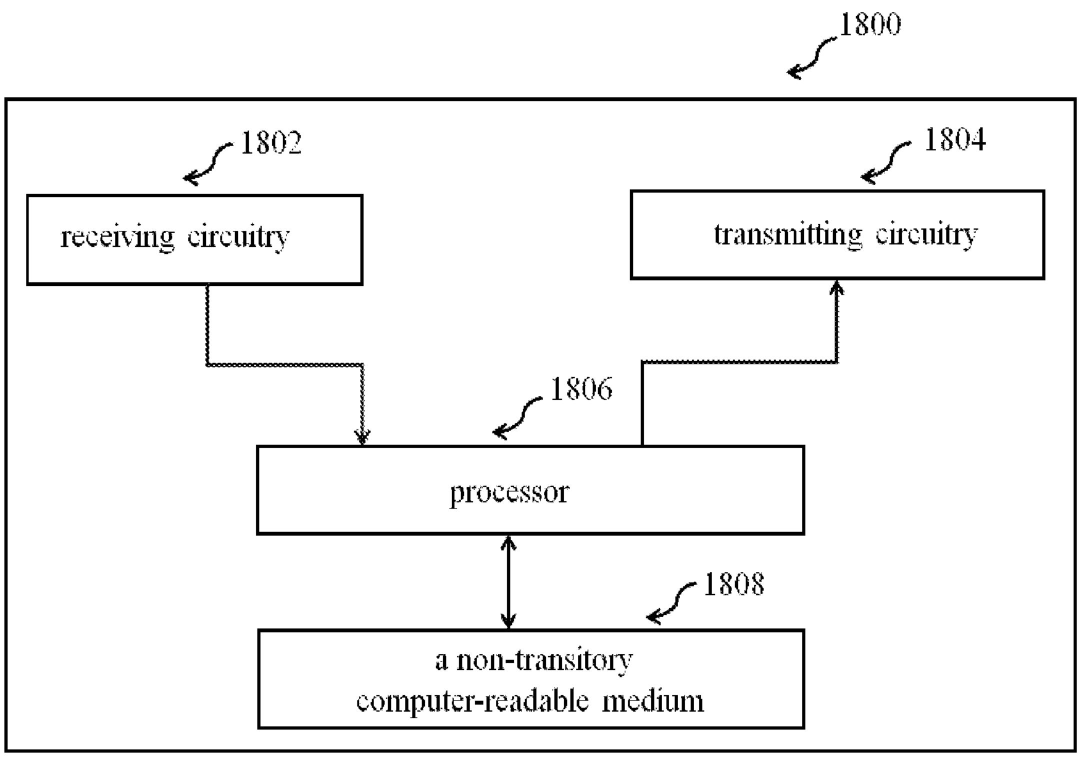
FIG. 18 illustrates a block diagram of an exemplary apparatus in accordance with some embodiments of the present application.

FIG. 18 illustrates a block diagram of an exemplary apparatus in accordance with some embodiments of the present application. Referring to FIG. 18, the apparatus 1800 includes a receiving circuitry 1802, a transmitting circuitry 1804, a processor 1806, and a non-transitory computer-readable medium 1808. The processor 1806 is coupled to the non-transitory computer-readable medium 1808, the receiving circuitry 1802, and the transmitting circuitry 1804.

It is contemplated that some components are omitted in FIG. 18 for simplicity. In some embodiments, the receiving circuitry 1802 and the transmitting circuitry 1804 may be integrated into a single component (e.g., a transceiver).

In some embodiments, the non-transitory computer-readable medium 1808 may have stored thereon computer-executable instructions to cause a processor to implement the operations with respect to UE(s) as described above. For example, upon execution of the computer-executable instructions stored in the non-transitory computer-readable medium 1808, the processor 1806, the receiving circuitry 1802 and the transmitting circuitry 1804 perform the method of FIG. 5, including: the processor 1806 determines whether a SL DRX procedure is enabled, and in response to the SL DRX procedure being enabled, the receiving circuitry 1802 receives SL DRX configuration information containing a priority of the SL DRX procedure.

In some embodiments, the non-transitory computer-readable medium 1808 may have stored thereon computer-executable instructions to cause a processor to implement the operations with respect to BS(s) as described above. For example, upon execution of the computer-executable instructions stored in the non-transitory computer-readable medium 1808, the processor 1806, the receiving circuitry 1802 and the transmitting circuitry 1804 perform the method of FIG. 8, including: the receiving circuitry 1802 receives partial sensing configuration information from Rx UE, and the processor 1806 determines SL DRX configuration information for the Rx UE.

In some embodiments, the non-transitory computer-readable medium 1808 may have stored thereon computer-executable instructions to cause a processor to implement the operations with respect to BS(s) as described above. For example, upon execution of the computer-executable instructions stored in the non-transitory computer-readable medium 1808, the processor 1806, the receiving circuitry 1802 and the transmitting circuitry 1804 perform the method of FIG. 17, including: the receiving circuitry 1802 receives partial sensing configuration information from Tx UE, and the processor 1806 determines SL DRX configuration information for Rx UE.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:
- at least one memory; and
- at least one processor coupled with the at least one memory and operable to cause the UE to:
  - determine whether a sidelink (SL) discontinuous reception (DRX) procedure is enabled;
  - receive, in response to the SL DRX procedure being enabled, SL DRX configuration information, wherein the SL DRX configuration information comprises a SL DRX cycle gap parameter, a SL DRX active time parameter, or a SL DRX offset parameter;
  - receive a higher layer parameter indicating a priority of a partial sensing procedure being higher than a priority of the SL DRX procedure, wherein the higher layer parameter enables partial sensing during an inactive time of the SL DRX procedure; and
  - perform, based on the priority of the partial sensing procedure being higher than the priority of the SL DRX procedure, a sensing operation in an on sensing duration of the partial sensing procedure when the on sensing duration is located within an off duration of the SL DRX procedure.

2. The UE of claim 1, wherein the SL DRX configuration information is determined based on a priority of predicted reception traffic.

3. The UE of claim 1, wherein the SL DRX configuration information is determined based on a default priority of the SL DRX procedure.

4. The UE of claim 1, wherein the SL DRX configuration information includes a parameter indicating the priority of the SL DRX procedure, and the parameter is selected from one or more priority values.

5. The UE of claim 1, wherein the at least one processor is operable to cause the UE to:
- compare the priority of the partial sensing procedure and the priority of the SL DRX procedure.

6. The UE of claim 1, wherein the priority of the partial sensing procedure is determined based on a priority of predicted transmission traffic.

7. The UE of claim 1, wherein the priority of the partial sensing procedure is determined based on a default priority of the partial sensing procedure.

8. The UE of claim 1, wherein the at least one processor is operable to cause the UE to:
- perform, in response to the priority of the SL DRX procedure being higher than the priority of the partial sensing procedure, the sensing operation in the on sensing duration of the partial sensing procedure when the on sensing duration is located within an on duration of the SL DRX procedure; and
- monitor one or more partial sensing subframes for physical sidelink shared channel (PSSCH) transmission.

9. The UE of claim 1, wherein the at least one processor is operable to cause the UE to:
- stop, in response to the priority of the SL DRX procedure being higher than the priority of the partial sensing procedure, performing the sensing operation in the on sensing duration of the partial sensing procedure when the on sensing duration is located within the off duration of the SL DRX procedure.

10. The UE of claim 9, wherein the at least one processor is operable to cause the UE to:

use, in response to supporting a random selection procedure for a resource pool, the random selection procedure to select a resource from a set of candidate subframes corresponding to the on sensing duration of the partial sensing procedure when the on sensing duration is located within the off duration of the SL DRX procedure.

11. The UE of claim 1, wherein the SL DRX configuration information is received from a higher layer.

12. The UE of claim 1, wherein the priority of the partial sensing procedure is received from a higher layer.

13. The UE of claim 1, wherein the at least one processor is operable to cause the UE to:

report partial sensing configuration information to a different UE.

14. The UE of claim 13, wherein the partial sensing configuration information comprises one or more of a partial sensing cycle gap parameter, a partial sensing active time parameter, or a partial sensing offset parameter.

15. The UE of claim 1, wherein the SL DRX configuration information is received from a different UE.

16. A method performed by a user equipment (UE), the method comprising:

determining whether a sidelink (SL) discontinuous reception (DRX) procedure is enabled;

receiving, in response to the SL DRX procedure being enabled, SL DRX configuration information, wherein the SL DRX configuration information comprises a SL DRX cycle gap parameter, a SL DRX active time parameter, or a SL DRX offset parameter;

receiving a higher layer parameter indicating a priority of a partial sensing procedure being higher than a priority of the SL DRX procedure, wherein the higher layer parameter enables partial sensing during an inactive time of the SL DRX procedure; and perform, based on the priority of the partial sensing procedure being higher than the priority of the SL DRX procedure, a sensing operation in an on sensing duration of the partial sensing procedure when the on sensing duration is located within an off duration of the SL DRX procedure.

17. The method of claim 16, wherein the SL DRX configuration information is received from a higher layer.

18. The method of claim 16, wherein the SL DRX configuration information is determined based on a priority of predicted reception traffic.

19. The method of claim 16, wherein the SL DRX configuration information is determined based on a default priority of the SL DRX procedure.

20. A processor for wireless communication, comprising:

at least one controller coupled with at least one memory and operable to cause the processor to:

determine whether a sidelink (SL) discontinuous reception (DRX) procedure is enabled;

receive, in response to the SL DRX procedure being enabled, SL DRX configuration information, wherein the SL DRX configuration information comprises a SL DRX cycle gap parameter, a SL DRX active time parameter, or a SL DRX offset parameter;

receive a higher layer parameter indicating a priority of a partial sensing procedure being higher than a priority of the SL DRX procedure, wherein the higher layer parameter enables partial sensing during an inactive time of the SL DRX procedure; and perform, based on the priority of the partial sensing procedure being higher than the priority of the SL DRX procedure, a sensing operation in an on sensing duration of the partial sensing procedure when the on sensing duration is located within an off duration of the SL DRX procedure.

* * * * *